United States Patent
Solie et al.

(10) Patent No.: US 6,702,200 B2
(45) Date of Patent: Mar. 9, 2004

(54) NOZZLE ATTITUDE CONTROLLER FOR SPOT AND VARIABLE RATE APPLICATION OF AGRICULTURAL CHEMICALS AND FERTILIZERS

(75) Inventors: John B. Solie, Stillwater, OK (US); Marvin L. Stone, Stillwater, OK (US); Stewart D. Reed, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 308 days.

(21) Appl. No.: 09/912,230

(22) Filed: Jul. 24, 2001

(65) Prior Publication Data

US 2003/0019949 A1 Jan. 30, 2003

(51) Int. Cl.⁷ .......................... E01C 19/16; B05B 03/02
(52) U.S. Cl. ...................... 239/172; 239/159; 239/160; 239/161; 239/162; 239/164; 239/176
(58) Field of Search ................... 239/146, 155, 239/156, 159, 160, 161, 162, 164, 172, 176

(56) References Cited

U.S. PATENT DOCUMENTS

| | | | | |
|---|---|---|---|---|
| 3,202,359 A | * | 8/1965 | Gill, Jr. .......................... 239/1 |
| 3,877,645 A | | 4/1975 | Oligschlaeger |
| 3,910,701 A | | 10/1975 | Henderson et al. ........... 356/39 |
| 3,987,964 A | * | 10/1976 | Pittman et al. .............. 239/169 |
| 5,144,767 A | | 9/1992 | McCloy et al. ............... 47/1.7 |
| 5,222,324 A | | 6/1993 | O'Neall et al. .............. 47/1.7 |
| 5,296,702 A | | 3/1994 | Beck et al. ................. 250/226 |
| 5,389,781 A | | 2/1995 | Beck et al. ................. 250/226 |
| 5,507,115 A | | 4/1996 | Nelson .......................... 47/1.7 |
| 5,585,626 A | | 12/1996 | Beck et al. ............... 250/222.1 |
| 5,606,821 A | | 3/1997 | Sadjadi et al. ................. 47/1.7 |
| 5,763,873 A | | 6/1998 | Beck et al. .............. 250/214 B |
| 5,768,823 A | | 6/1998 | Nelson .......................... 47/1.7 |
| 5,789,741 A | | 8/1998 | Kinter et al. ................ 250/226 |
| 5,793,035 A | | 8/1998 | Beck et al. ............... 250/222.1 |
| 5,809,440 A | | 9/1998 | Beck et al. .................... 701/50 |
| 5,833,144 A | | 11/1998 | Kinter ......................... 239/462 |
| 5,837,997 A | | 11/1998 | Beck et al. ............. 250/227.11 |
| 5,911,363 A | | 6/1999 | Oligschlaeger |
| 6,062,496 A | | 5/2000 | Kinter ......................... 239/462 |
| 6,206,300 B1 | | 3/2001 | Roudebush et al. |
| 6,568,097 B2 | * | 5/2003 | Eckard ......................... 33/626 |

OTHER PUBLICATIONS

Patchen Weed Seeker™ PhD1620 Brochure, Undated.
Patchen Weed Seeker™ PhD600 Brochure, Undated.

* cited by examiner

Primary Examiner—Robin O. Evans
(74) Attorney, Agent, or Firm—Fellers, Snider Blankenship, Bailey & Tippens, P.C.

(57) ABSTRACT

A nozzle attitude controller for use in connection with a farming apparatus for precision farming, the apparatus comprising an applicator vehicle, a boom supported by and extending across the rear of the vehicle, a manifold rotatably supported by the boom, a plurality of nozzles disposed from the manifold and oriented in a direction opposite to the direction of movement of the vehicle, but disposed at an angle with respect to the horizontal, the attitude controller including a linear actuator operated by a stepper motor and a radar sensor which connects to the stepper motor and which measures the speed of the vehicle such that pulses from the radar sensor to the stepper motor moves the linear actuator to change the angle of the nozzle so that the horizontal component of its velocity is equal and opposite to the speed of the vehicle.

6 Claims, 4 Drawing Sheets

NOZZLE ATTITUDE CONTROLLER FOR SPOT AND VARIABLE RATE APPLICATION OF AGRICULTURAL CHEMICALS AND FERTILIZERS

BACKGROUND OF THE INVENTION

1. Field of the Invention

This invention relates generally to a spray nozzle for use in precision farming. More particularly, but not by way of limitation, the present invention relates to an attitude controller which accounts for vehicle velocity in the delivery of an agricultural product.

2. Background

Precision farming is a term used to describe the management of intrafield variations in soil and crop conditions. Site specific farming, prescription farming, and variable rate application technology are sometimes used synonymously with precision farming to describe the tailoring of soil and crop management to the conditions at discrete, usually contiguous, locations throughout a field. The size of each location depends on a variety of factors, such as the type of operation performed, the type of equipment used, the resolution of the equipment, as well as a host of other factors. Generally speaking, the smaller the location size, the greater the benefits of precision farming, at least down to approximately one square meter.

Typical precision farming techniques include: varying the planting density of individual plants based on the ability of the soil to support growth of the plants; and the selective application of farming products such as herbicides, insecticides, and, of particular interest, fertilizer.

In contrast, the most common farming practice is to apply a product to an entire field at a constant rate of application. The rate of application is selected to maximize crop yield over the entire field. Unfortunately, it would be the exception rather than the rule that all areas of a field have consistent soil conditions and consistent crop conditions. Accordingly, this practice typically results in over application of product over a portion of the field, which wastes money and may actually reduce crop yield, while also resulting in under application of product over other portions of the field, which may also reduce crop yield.

Perhaps even a greater problem with the conventional method is the potential to damage the environment through the over application of chemicals. Excess chemicals, indiscriminately applied to a field, ultimately find their way into the atmosphere, ponds, streams, rivers, and even the aquifer. These chemicals pose a serious threat to water sources, often killing marine life, causing severe increases in algae growth, leading to eutrophication, and contaminating potable water supplies.

Thus it can be seen that there are at least three advantages to implementing precision farming practices. First, precision farming has the potential to increase crop yields which will result in greater profits for the farmer. Second, precision farming may lower the application rates of seeds, herbicides, pesticides, and fertilizer, reducing a farmer's expense in producing a crop. Finally, precision farming will protect the environment by reducing the amount of excess chemicals applied to a field, which may ultimately end up in the atmosphere, a pond, stream, river, or other water source.

Agricultural applicators that apply fertilizers, pesticides, and other materials are typically attached to a moving tractor and must account for vehicle velocity, material velocity, and elevation above the target, if the machine is to apply the material at the intended rate only to a specific target. Existing applicators are adjusted manually, by trial and error, or use an estimate of the flight time of the applied material and the vehicle velocity to calculate the time at which the applicator is triggered in order to deposit material on the target. The former method does not permit dynamic adjustment for changes in vehicle velocity, material ejection velocity, or elevation of the nozzle above the target. The latter method is difficult to calculate, may not be fast enough to account for changes in elevation of the nozzle above the target and changes in the material ejection velocity, and does not account for differences in the in-flight velocities of different sized particles. In addition, the measurement of elevation changes is difficult and expensive.

The present invention is important because it enables the agronomist to minimize applicator boom height, material exit velocity, and applicator vehicle velocity as factors affecting the location that the material impacts the target surface. The art is developing mobile optical sensing technologies that enable one to identify specific plant targets, determine the amount of material to be applied, and apply material only to the plant target. Applicator boom height, material exit velocity, and vehicle velocity normally vary during farming operations. Current technologies attempt to hold these variables constant, which greatly reduces the flexibility of operation and needlessly complicates the system. A device that automatically counteracts controllable factors causing off target deposition of materials will greatly improve the efficiency of an optical sensor based variable rate applicator.

SUMMARY OF THE INVENTION

The invention disclosed herein adjusts the angle of the device emitting the material (hereinafter referred to as the "nozzle") so that the horizontal exit velocity of the material is equal in magnitude and opposite in direction to the applicator vehicle velocity. By negating the horizontal velocity of the vehicle, the horizontal velocity of the material emitted from the nozzle is zero, absent other external disturbances. Consequently, if the material is ejected over the target from any height above the target, it falls onto the target. While the inventive device can apply liquid, granular or gaseous materials, by way of example and not limitation, the preferred embodiment is described herein with regard to the delivery of liquid materials. However, as will be apparent to those skilled in the art, devices to apply granular or gaseous materials would be similar in design.

The nozzle attitude controller consists of a horizontal manifold or pipe, oriented perpendicular to the direction of travel by the applicator-vehicle. This manifold is suspended from a frame or boom. Liquid material is conveyed through the manifold to a series of nozzles oriented perpendicular to the axis of the manifold and in the same plane. The manifold is supported by bearings and is linked to a linear actuator as shown in FIG. 1. The linear actuator rotates the manifold around its axis. Liquid materials are ejected through the nozzle orifice. Ejection velocity can be calculated by:

$$V_j = C_v(2\Delta p/\rho)^{1/2} \tag{1}$$

Where:

$V_J$=Liquid jet velocity $C_v$=nozzle velocity coefficient $\Delta p$=difference in pressure across the orifice $\rho$=liquid density The velocity coefficient is a known or measurable property of the nozzle; the liquid density is a known or measurable fluid property. Pressure transducers can be installed to measure the spray system differential pressure. The ejection angle, where the horizontal component of liquid velocity is equal to the vehicle velocity, can be calculated by the following equation:

$$\Theta = \cos^{-1}[V_v/C_v(2\Delta p/\rho)^{1/2}] \tag{2}$$

Where:

$\Theta$=nozzle angle of inclination $V_v$=applicator vehicle velocity

Nozzle angle may be measured to provide position feedback for a control system.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENTS

Figure 1A:
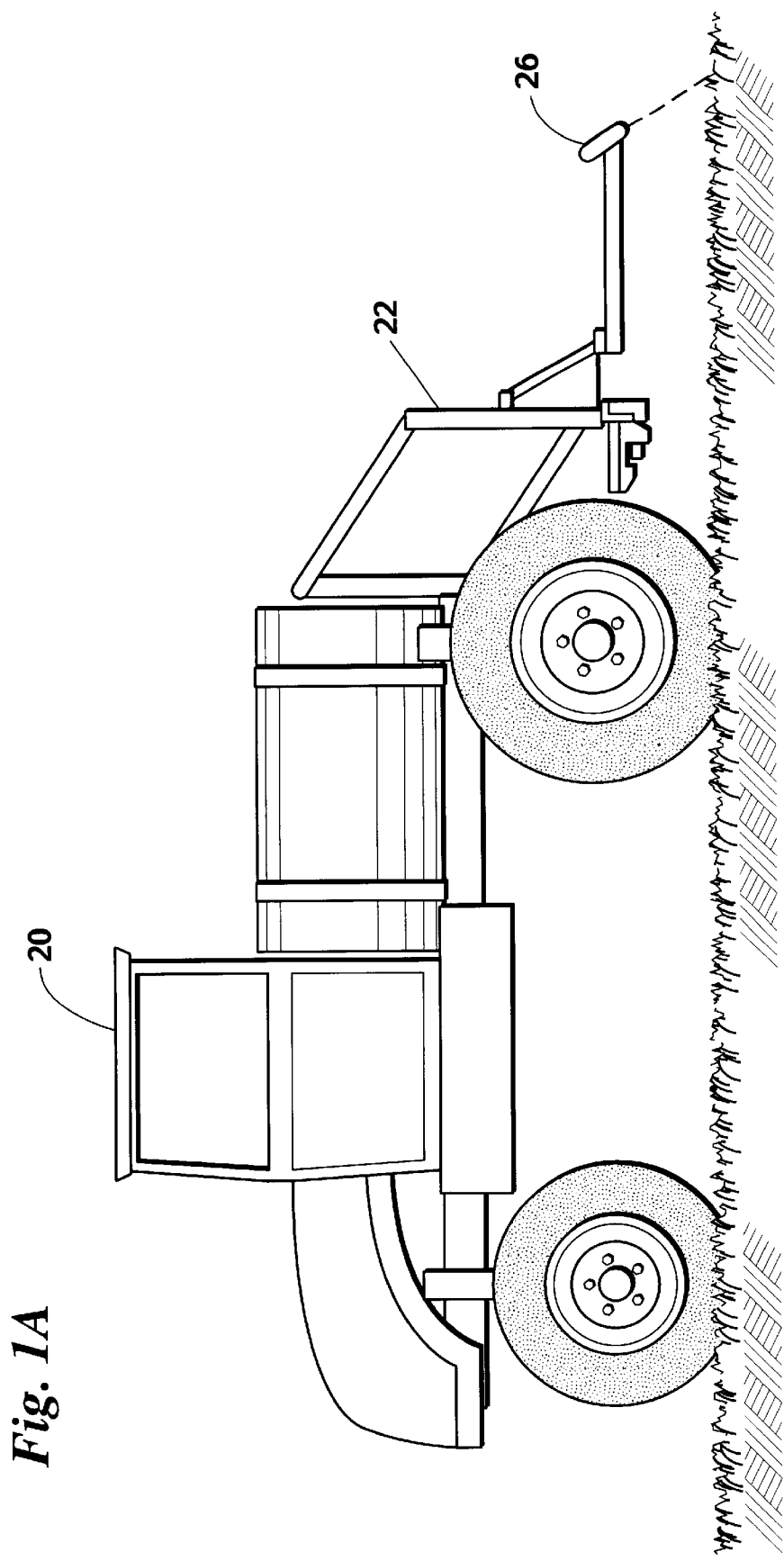
FIG. 1A is a side elevation of a vehicle, to which the device of the present invention is attached.

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Before referring to the drawings, it is believed that a few comments concerning nozzle and actuator geometry would be helpful to an understanding of this invention.

Normal pattern uniformity of agricultural spray nozzles at standard spacing is sensitive to changes in height above the target. This problem can be minimized by using jet nozzles, mounted to produce parallel fluid jets, when the material can be applied in parallel bands. Spacing of parallel fluid jets will remain constant independent of height above the travel distance (the combination of height above the target and nozzle inclination angle). When materials must be continuously and uniformly distributed over the target surface, the problem of flight distance is more difficult. The effect of flight distance can be minimized by mounting nozzles with very small fan angles close together, a high-density nozzle manifold. Nozzles customarily used have fan or distribution angles of 65 to 110 degrees, and nozzles are spaced so that distribution patterns overlap only about 30%, typically 20 to 30 inches. We propose to mount nozzles with fan angles as small as 15 degrees at 3 to 4 inch spacing. This will produce a pattern with 30 to 200% overlap, with only minor changes in distribution uniformity with large changes in spray material travel distance.

Figure 2:
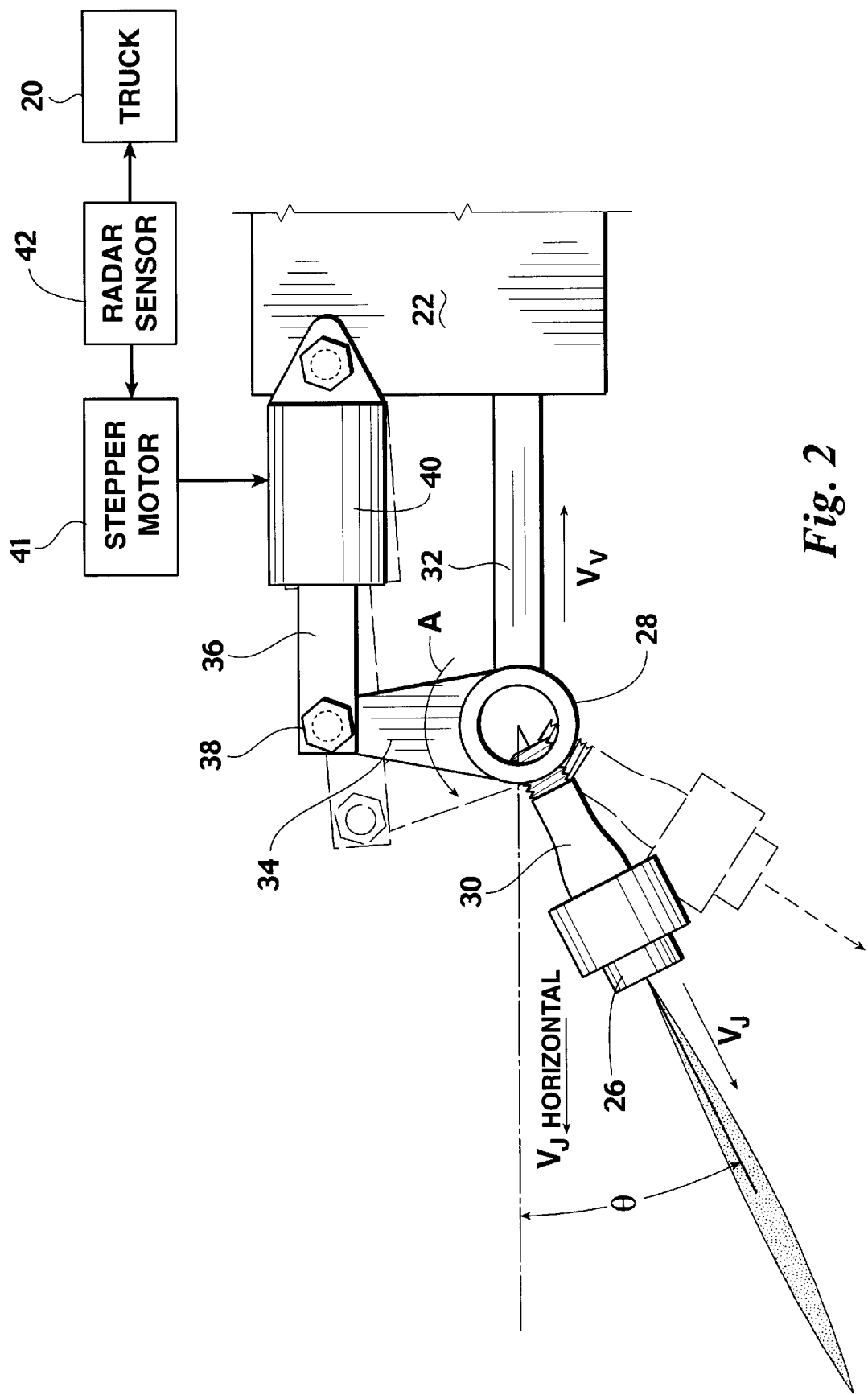
FIG. 2 is a semi diagrammatic side elevation of a portion at the rear of the truck of FIG. 1, showing some of the details of the controls of the spray nozzles.

The nozzle attitude controller may operate as follows:

1. At start up, the spray nozzle velocity coefficient and spray solution density will be transmitted to a single-board microprocessor controller via a controller area network (CAN)
2. The microprocessor will receive applicator vehicle velocity and spray system operating pressure from remote sensors via the network at regular intervals.
3. The controller calculates the spray solution discharge velocity, with equation 1 (below) and the nozzle angle, with equation 2 (below), required to negate the applicator vehicle velocity.
4. The controller then powers the linear actuator, which rotates the manifold and nozzle bank, while polling a sensor, which measures manifold angular displacement. The manifold is rotated until the nozzles are oriented at the calculated angle.
5. The microprocessor continues to monitor spray system pressure and applicator velocity. Should pressure change (which can occur if spray solution flow-rate is changed to compensate for changes in vehicle velocity) and/or applicator velocity is changed, the microprocessor recalculates nozzle angle and adjusts that angle to compensate for changes in the system The nozzle attitude controller consists of a horizontal manifold or pipe, oriented perpendicular to the direction of travel by the applicator-vehicle. This manifold is suspended from a frame or boom. Liquid material is conveyed through the manifold to a series of nozzles oriented perpendicular to the axis of the manifold and in the same plane. The manifold is supported by bearings and is linked to a linear actuator as shown in FIG. 2. The linear actuator rotates the manifold around its axis. Liquid materials are ejected through the nozzle orifice at an ejection velocity calculated by:

$$V_j = C_v(2\Delta p/\rho) \tag{1}$$

Where:

$V_j$=Liquid jet velocity $C_v$=nozzle velocity coefficient $\Delta p$=difference in pressure across the orifice $\rho$=liquid density The velocity coefficient is a known or measurable property of the nozzle; the liquid density is a known or measurable fluid property. Pressure transducers can be installed to measure the spray system differential pressure. The ejection angle, where the horizontal component of liquid velocity is equal to the vehicle velocity, can be calculated by the following equation:

$$\Theta = \cos^{-1}[V_v/C_v(2\Delta p/\rho)^{1/2}] \tag{2}$$

Where:

$\Theta$=nozzle angle of inclination $V_v$=applicator vehicle velocity

Nozzle angle will be measured to provide position feedback for a control system.

Referring now to the drawings, where reference numerals indicate the same parts throughout the several views, FIG. 1A shows a vehicle 20 of the type used to spray fertilizer or pesticides. The vehicle has a boom 22, which extends laterally from the rear of the vehicle 20. A plurality of spray nozzles 26 are arranged in spaced relation behind the boom 22 and attached thereto in a manner later to be described.

Turning now also to FIG. 2, each nozzle 26 connects with a manifold 28 through a nozzle housing 30. The manifold 28 is rotatable as shown by the arrow in FIG. 2 in a manner to be described. The manifold and the nozzle housing 30 are both hollow, so as to provide liquid or powdered material under pressure through the nozzle 26 to create the spray pattern indicated. A plurality of nozzle supports 32 (only one of which is shown in FIG. 2) project outwardly and rearwardly from the boom 22 and connect at spaced intervals with the manifold 28. The connections between the ends of the horizontal supporting members 32 and the manifold 28 are such that the manifold is rotatably received at the ends of these supports 32.

In order to provide pivotal movement of the manifold 28 an arm 34 is connected to the manifold 28 and projects outwardly and upwardly therefrom.

The arm 34 can be singular or plural. The outer end of the arm 34 connects pivotally with a shaft 36 through a bolt 38, which permits pivotal movement between the arm 36 and the arm 34. The shaft 36 is preferably connected to, or is part of, a linear actuator 40 which includes a ball-screw-type mechanism (not shown) whereby the shaft 36 can move to the right or to the left so as to pivot the arm 34 counterclockwise or clockwise, as the case may be. A stepper motor 41 (shown only diagrammatically) connects with the linear actuator 40, which also constitutes the housing for the ball screw actuator. The internal details of the ball screw are not shown, but one needs only to know that the ball screw mechanism turns around the shaft 36 so as to cause inward or outward movement of the shaft 36 relative to linear actuator 40. The stepper motor 41 turns the ball mechanism (not shown) to move the shaft 36 longitudinally. A radar sensor 42 connects with the stepper motor 41 and also connects with the truck. The radar sensor is adapted to sense the speed of the truck and to deliver pulses to the stepper motor 41 commensurate with the speed of the truck. The pulses provided by the radar sensor 42 through the stepper motor 41 will determine the angle Θ

As will be apparent to those skilled in the art, linear actuators are available in a variety of types and any type of such actuator is suitable to steer the inventive nozzle. By way of example and not limitations other suitable types of linear actuators include: hydraulic cylinders, pneumatic cylinders, rack and pinion mechanisms, and the like.

Figure 1B:
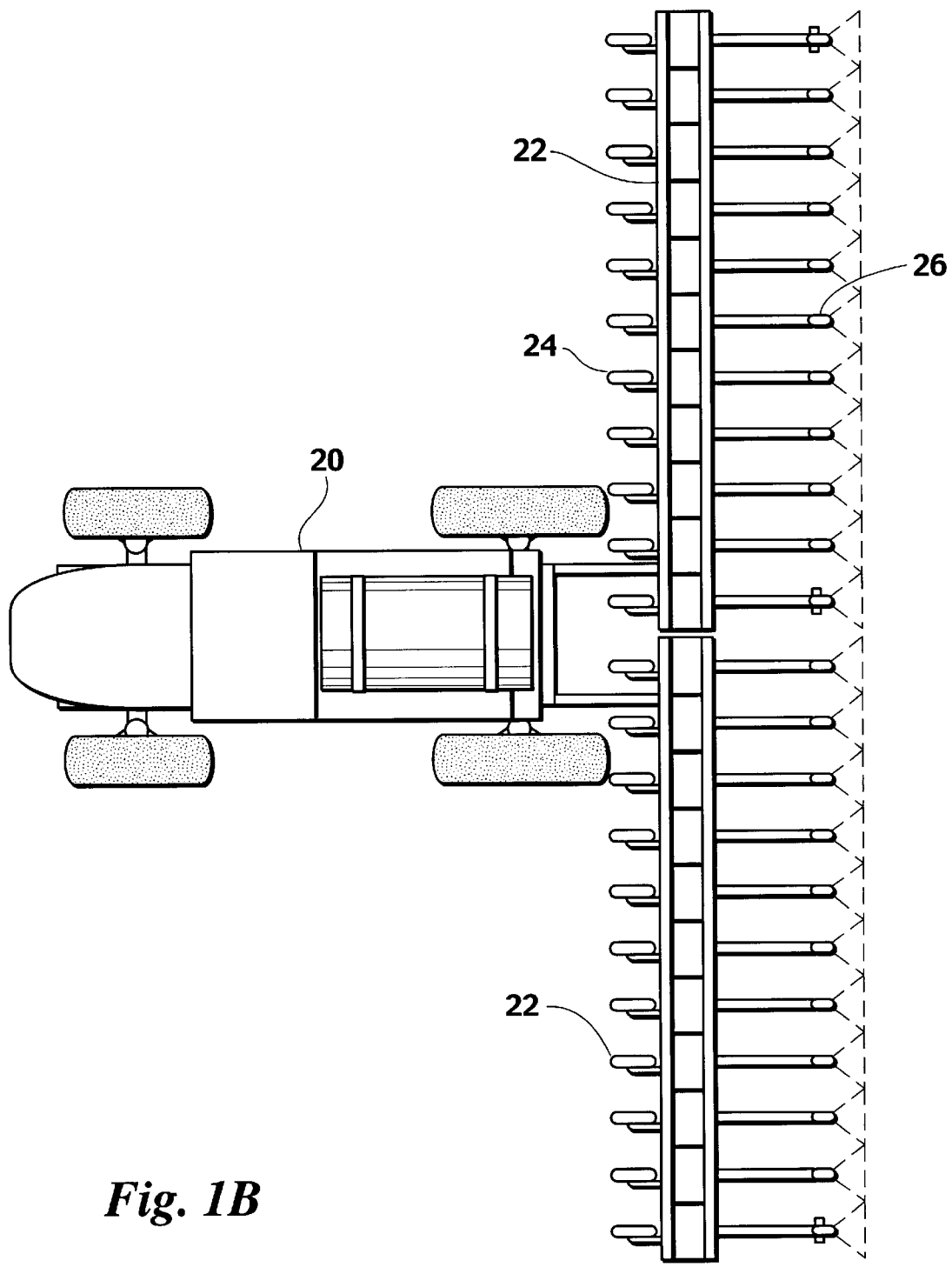
FIG. 1B is a top view of the vehicle, to which the device of the present invention is attached.

In a typical application as shown in FIG. 1B, multiple sensors, of which sensor 24 is representative, will be located along the manifold or boom in essential alignment with the inventive nozzles, of which nozzle 26 is representative. Each sensor 24, whose function will be set forth in a separate disclosure, and which form no part of the present invention, is adapted to sense the needs of the plants (not shown) in its immediate view below the boom 22 and vary the quantity of material exiting from the corresponding nozzle 26, which is associated with that particular sensor.

Figure 3:
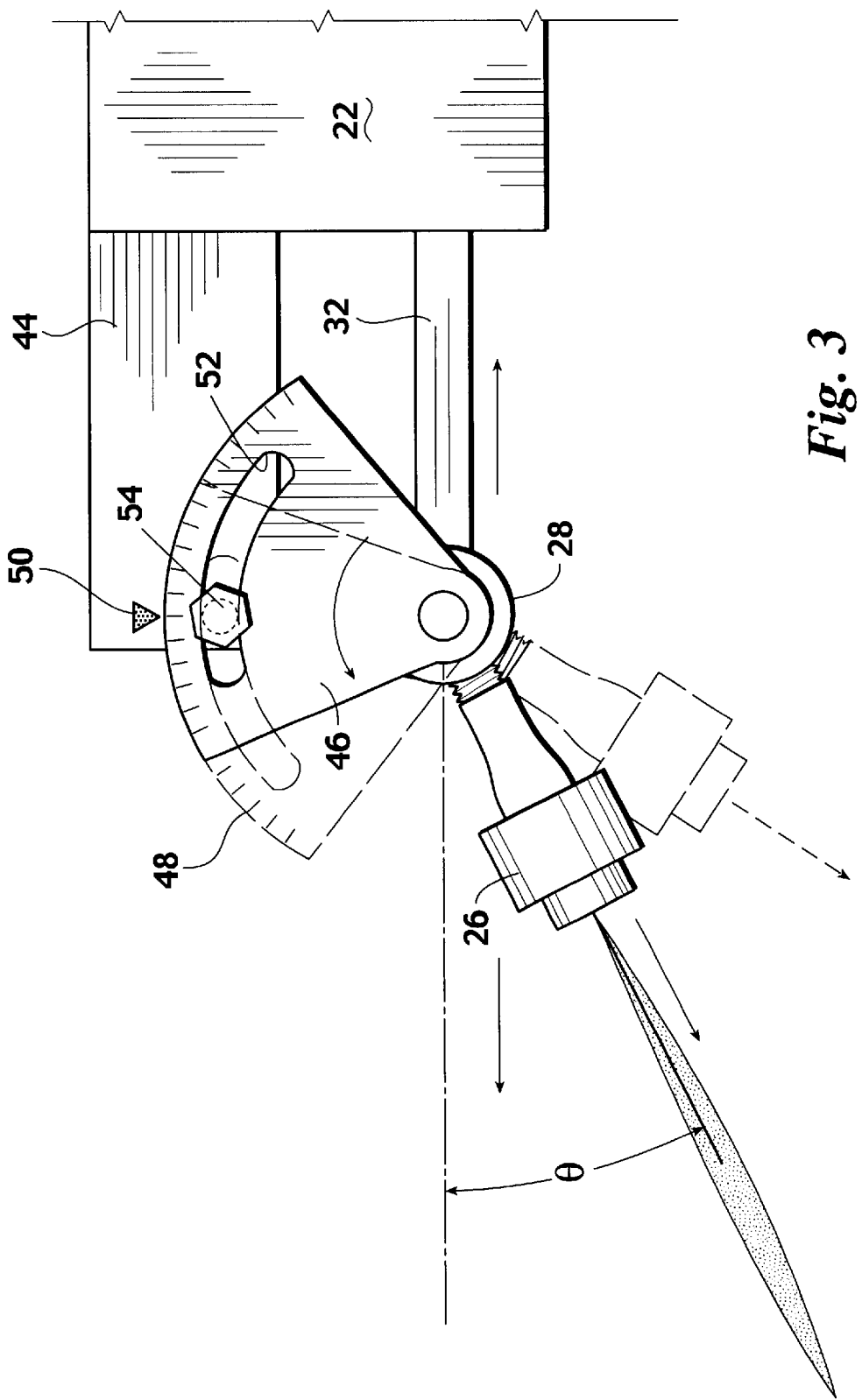
FIG. 3 is a view similar to FIG. 2, but showing a modified form of the invention.

As shown in FIG. 3, in an alternate embodiment, the nozzle 26 connects with the manifold 28 in essentially the same manner as previously described, and the manifold 28 will be supported by a plurality of horizontal supporting members 32 extending outwardly from the boom 22. In the environment shown in FIG. 3, the elements 36 through 42 are not included. Instead, an upper horizontal support 44 extends rearwardly from the boom 22. A protractor 46 is attached to one end of the manifold 20 so as to be rotatable therewith. If the fluid density and orifice velocity coefficients are fixed, the outer arcuate portion 48 of the protractor 46 may be provided with graduations representing miles per hour. If fluid density and orifice velocity coefficients are not constant, the outer arcuate portion 48 would preferably be graduated in degrees, Θ. A coordinating pointer 50, attached to the horizontal support 44 is adapted to cooperate through the outer arcuate surface 48 to indicate what particular speed is represented by the given relationships between the pointer and the graduations. As shown in FIG. 3, the pointer 50 could very easily represent a condition relating to ten miles per hour of the vehicle 20. The protractor 46 may be locked in place relative to pointer 50 to maintain the desired nozzle attitude for proper delivery of the material. Preferably, to lock protractor 46 in place, an arcuate slot 52 is provided through which a bolt 54 passes so as to be threadedly received within the horizontal support 44. If it is desired, for example, to operate the vehicle at 10 mph, the pointer 50 and the protractor 46 would be positioned as shown in FIG. 3 and the bolt 54 thereafter tightened. The vehicle is then configured to maintain the indicated speed during the spraying operation. The manifold pressure may be modulated somewhat according to the equations given above to account for minor fluctuations in vehicle velocity.

As will be apparent to those skilled in the art, while two means have been shown for rotating manifold 28, many other variations are possible. By way of example and not limitation, the manifold could be supported directly from the output shaft of a motor while the boom is secured to the housing of the motor to cause rotation of the manifold, or a turnbuckle could be installed in the position of linear actuator 40 and provided with a graduated linear scale for positioning the nozzles for a given set of spraying conditions.

Returning now to FIGS. 1 and 2, the vehicle 20 will be traversing toward the right at a velocity of $V_v$. The liquid coming out of the nozzle 26 will be sprayed at a velocity of $V_j$ and under pressure $\Delta p$. The horizontal component of the spray nozzle velocity is $V_j$ horizontal, as shown on the drawing. If the velocity of $V_j$ horizontal equals $V_v$, then the liquid coming out of the nozzle will be deposited over the ground (not shown) at zero horizontal velocity. This, of course, is the situation hoped for with the invention described herein.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A farming apparatus for precision farming comprising:

an applicator vehicle;

a plurality of variable rate applicators supported by said vehicle, said applicators constituting spaced nozzles mounted to a rotatable manifold, means for rotating said manifold so as to change the attitude of said nozzles to where the horizontal component of the jet velocity from the nozzles is equal and opposite to that of the applicator vehicle.

2. The farming apparatus of claim 1 wherein said means for rotating said manifold comprises a linear actuator.

3. A variable rate applicator system adapted to be supported from a boom extending from the rear of an applicator vehicle comprising a rotatable manifold connected to the boom, a plurality of nozzles attached to the manifold in spaced relation for the purpose of spraying a solution onto the ground, a rotation means connected to the boom and to the manifold for rotating the manifold thereby to vary the angle of the nozzle with respect to the horizontal, means for moving said rotation means in response to the speed of the vehicle to change the angle of the spray nozzle with respect to the horizontal so that the horizontal component of the spray velocity is equal and opposite to the velocity of the vehicle.

4. A variable rate applicator system as set forth in claim 3, wherein said rotation means comprises a linear actuator and said means for moving said rotation means comprises a stepper motor in communication with a radar sensor which senses the speed of the vehicle, the radar sensor sending pulses to the stepper motor in response to the speed of the vehicle, said stepper motor moving said linear actuator in response to said pulses received from said radar sensor.

5. A variable rate applicator system as set forth in claim 3 wherein said rotation means comprises a protractor having a curved periphery with graduations thereon connected to the manifold so as to move rotatably therewith, the protractor having an arcuate slot therein in which a bolt is slideably received, the bolt being threaded into the horizontal extension, a pointer on the horizontal extension adjacent the periphery of the protractor, the graduations on the periphery of the protractor being employable with the pointer to determine the adjustment of the nozzle to an angle commensurate with the speed of the vehicle.

6. A variable rate applicator system according to claim 3 wherein the angle of the spray nozzle conforms to the following equation:

$$\Theta=\cos^{-1}[V_v/C_v(2\Delta p/\rho)^{1/2}]$$

Where:

$\Theta$=nozzle angle of inclination $V_v$=applicator vehicle velocity $\Delta p$=difference in pressure across the orifice $\rho$=liquid density.

* * * * *